Jan. 5, 1971  A. F. CHRISTENSEN  3,552,756
RADIALLY ADJUSTABLE TOOL HOLDER
Filed March 6, 1968  2 Sheets-Sheet 2

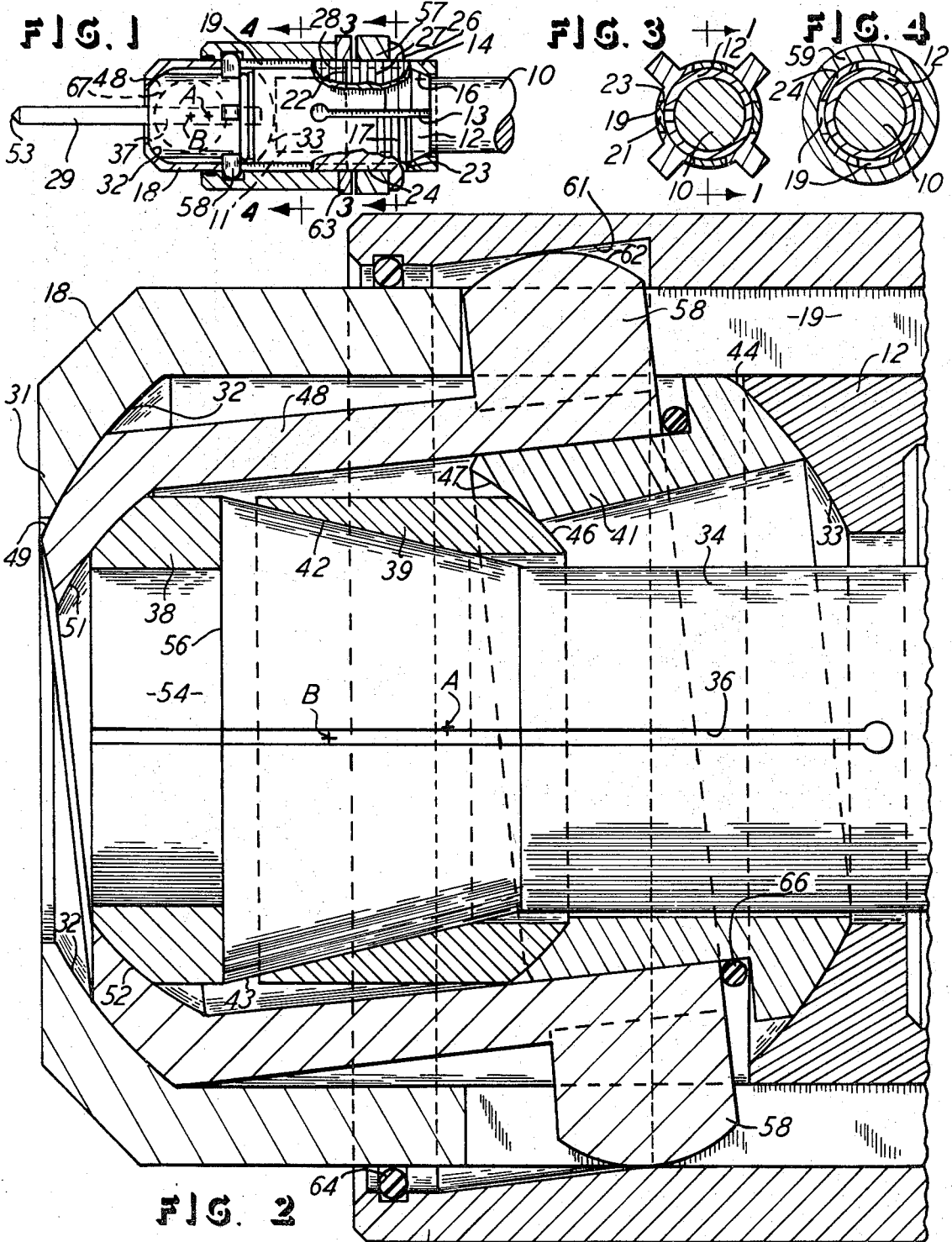

INVENTOR:

ALAN F. CHRISTENSEN

ATTORNEY

United States Patent Office 3,552,756
Patented Jan. 5, 1971

3,552,756
RADIALLY ADJUSTABLE TOOL HOLDER
Alan F. Christensen, 3401 17th St., Racine, Wis. 53405
Filed Mar. 6, 1968, Ser. No. 710,835
Int. Cl. B23b 31/34
U.S. Cl. 279—6                                7 Claims

ABSTRACT OF THE DISCLOSURE

A radially adjustable tool holder with a collet for securing a tool, and with a spindle mountable member for mounting the collet and tool onto a spindle. A collet clamp is interposed between the spindle mountable member and the collet, and the clamp includes two adjustable members so that the collet can be radially adjusted with respect to the spindle mountable member and thus the tool can be adjusted with respect to the axis of the spindle mountable member. The movable members are in the forms of two spheres, and together they provide for universal movement of the tool so that the tool can be disposed in any selected position with respect to the axis of the spindle mountable member. A cam and cam follower are cooperative between the spindle mountable member and the collet clamp for the radial adjustment mentioned. Also, lock members are provided for securing the collet clamp in adjusted positions, and for securing the spindle mountable member onto a spindle.

BACKGROUND OF THE INVENTION

This invention relates to a radially adjustable tool holder.

In the prior art, radially adjustable tool holders are known for the purpose of locating the axis of the tool, such as a drill, cutter, threading tools, boring tools, grinding tools, and the like. These prior art adjustable holders are therefore available to compensate for eccentricity between the axis of the tool and the axis of the supporting spindle or fixture. Thus the tool can be radially displaced to be brought in axial alignment with the axis of the supporting spindle, as desired. However, such prior art holders are difficult to adjust, they require extremely precise workmanship to produce the necessary adjusting parts, the reactive force in using the tool tends to cause the adjusting parts to become reset, and the tool can be adjusted only with respect to a co-axial or parallel position of adjustment of the tool with respect to the spindle axis.

The present invention overcomes the aforementioned problems, and it does so with a tool holder which is easily manufactured for very precise positioning of the tool, the tool can be readily disposed in its desired position of alignment with the spindle axis simply by holding the tip of the tool as the spindle and the holder with the tool are all rotated about the spindle axis, and the entire holder can be adjusted so that the tool can actually be disposed in a position angular to the axis of the spindle for purposes of forming tapered holes or any other purpose calling for an angulated tool. Still further, the tool holder of this invention can be readily set in a completely secure position so that the tool will not upset the precise setting, nor will the tool become inadvertently loose in the holder. Still further, the present invention provides a tool holder which can utilize a conventional type of collet, and the holder can be provided with seals for sealing against dust, chips, and coolant where these elements are all undesirable in the holder.

Still further, the present invention has a mechanical means for setting the adjusted positions of the tool, so het tool may be set in precise positions because there are adjustments of delicate and minute nature for obtaining the desired accurate settings of the tool.

With the aforesaid features of improvement over the prior art, the holder of this invention is also very useful in drill sharpening machines where a high degree of accuracy is required in controlling the drill and the sharpening tools.

BRIEF DESCRIPTION OF THE DRAWING

FIG. 1 is a longitudinal sectional view of an embodiment of a drill holder incorporating this invention, and showing it mounted on a spindle, and the view being taken substantially along the line 1—1 of FIG. 3.

FIG. 2 is an enlarged longitudinal sectional view of a portion shown in FIG. 1, and being similar to FIG. 1 but showing the interior of the holder.

FIG. 3 is a sectional view taken on the line 3—3 of FIG. 1.

FIG. 4 is a sectional view taken on the line 4—4 of FIG. 1.

FIG. 5 is a side elevational view of a different embodiment of a portion of this invention.

DETAILED DESCRIPTION OF THE PREFERRED EMBODIMENTS

Figure 6:
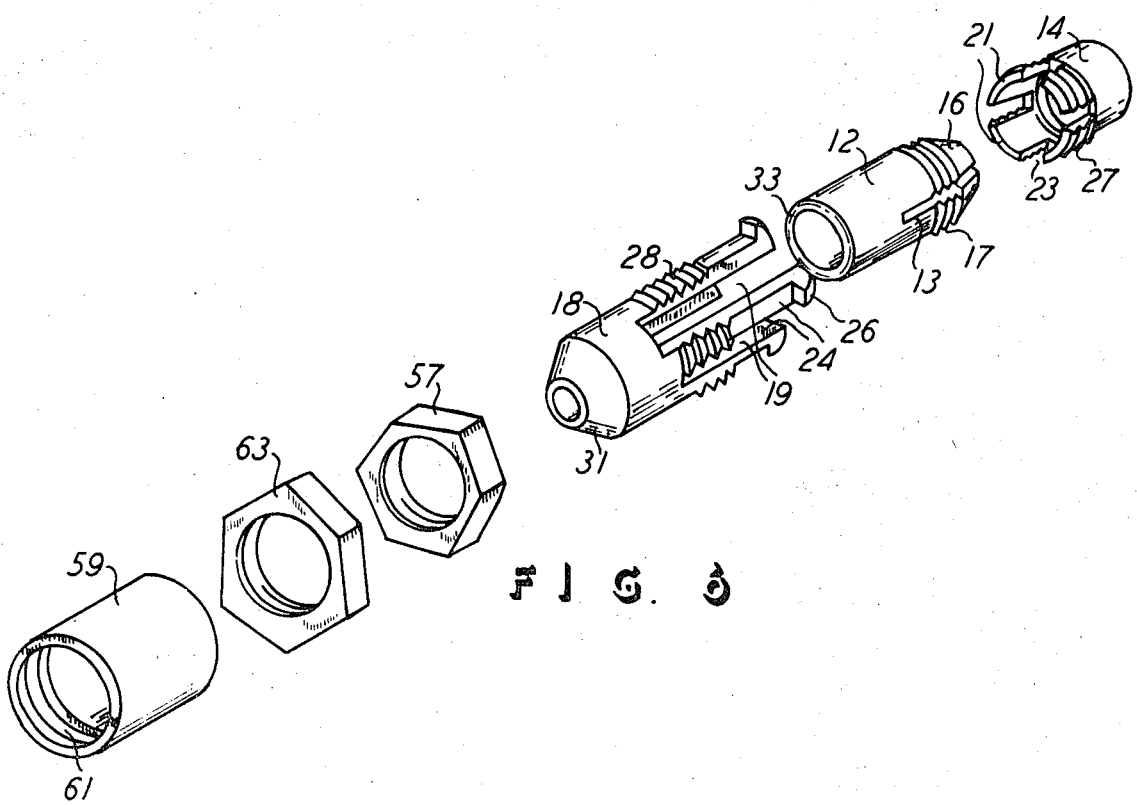
FIG. 6 is an exploded view of parts shown in FIG. 1.

FIG. 1 shows a fragment of a machine spindle 10 which has its inner end 11 extending within a sleeve 12. In FIGS. 1 and 6, the sleeve 12 is shown to be split at 13, so any force radially of the longitudinal axis of the spindle 10 will cause the sleeve 12 to be securely clamped onto the spindle 10. Such inward radial force is exerted on the spindle 10 by means of a tubularly shaped threaded nut 14 which surrounds the sleeve 12. The nut 14 and sleeve 12 have a similarly shaped conical portions extending along the common line designated 16. The arrangement is such that when the nut 14 is moved to the left in FIG. 1, it tends to slide on the conical surface on the end of the sleeve 12, and this causes the radial inward pressure on the sleeve 12 and thus the clamping of the sleeve 12 onto the spindle 10.

To exert the radial inward force, the nut 14 is moved to the left in FIG. 1, as mentioned, by being threaded over the threaded portion 17 on the exterior of the sleeve 12.

Another tubular piece 18 is mounted over the other end of the sleeve 12, as shown in FIG. 1. Thus the tubular pieces 14 and 18 are of the same diameter, and each one is actually formed with alternate slots and projecting prongs, so that the ends of the tubular pieces 14 and 18 adjacent each other are nested together in the slots and fingers mentioned. Thus, FIG. 3 shows the slots 19 in the piece 18, and it shows the fingers 21 in the piece 14, with fingers disposed in the slots 19. FIGS. 1 and 4 also show the slots 19 in the piece 18, and there are four such slots extending longitudinally of the piece. Further, FIG. 1 shows that the piece 14 terminates along the line 22.

Intermediate the fingers 21 on the piece 14, there are slots 23 extending axially or longitudinally of the piece 14. These slots 23 receive extending fingers 24 on the piece 18. The fingers 24 terminate in outwardly projecting ends 26. Thus FIG. 1 shows the lower portion of the sleeve 12 to be broken away to where the finger 24 is shown extending into the tubular piece 14 as described. In this manner, pieces 14 and 18 simply form one tubular piece over the sleeve 12, but they have interlocking fingers, as described. The pieces 14 and 18 have externally threaded sections 27 and 28, respectively. The upper portion of FIG. 1 shows the threaded sections in the fragmentary portion carrying the threads designated 27 and 28, and this is a portion shown fragmentarily wrapped over the sleeve 12. The threads 27 and 28 are available for a purpose described later, and they terminate at line 22.

The sleeve 12, and the pieces 14 and 18, all form a spindle mountable means or member, and the piece 18 extends axially beyond the spindle 10. FIG. 2 shows the extending end, and FIG. 1 shows this end to have a drill bit 29 mounted therein and extending axially beyond the holder shown.

The extending end of the member 18 is turned radially inwardly at portion 31, and it also has a portion of a spherical surface at 32. It will be noted that the spherical surface extends circularly around the piece 18, so FIG. 2 shows a surface 32 at the top and the bottom of the drawing. Also, a similarly shaped portion of a spherical surface 33 exists at the end of the sleeve 12. The dotted line designated 33 in FIG. 1 corresponds to the sleeve surface 33 of FIG. 2, and the spherical portions 32 and 33 are part of a sphere generated about the center designated A in FIGS. 1 and 2.

FIG. 2 shows a conventional collet 34 disposed axially aligned with a piece 18. The collet 34 has its usual longitudinal slits 36 which permit the collet to be clamped radially inwardly on the inner end 37 of the drill bit 29, in the usual manner.

A collet clamp, consisting of the three ring shaped pieces 38, 39, and 41, surround the collect 34. The piece 39 has a conical portion 42, and this portion mates with a similar conical portion 43 on the collect 34. Therefore, forcing the collet clamp pieces 38, 39, and 41 axially of the collect 34 will cause the clamp pieces to create the required radial inward pressure on the collet 34 to hold the drill bit 29.

It will therefore be noted that the piece 41 has a surface 44 which is formed as a portion of a sphere so that it mates with the spherically formed surface 33 on sleeve 12. Likewise, the pieces 39 and 41 have surfaces 46 and 47, respectively, formed as portions of spheres and generated about the same center and same radii, so that the surfaces 46 and 47 are in full mating contact, as are the surfaces 33 and 44 which are generated about the center A. Finally, the collet clamp, which includes the pieces 38, 39, and 41, is surrounded by a cylindrically shaped adjusting member 48. The member 48 has a surface 49 formed of a portion of a sphere generated about the center A, so that the spherical portions 32 and 49 are in full mating contact. Also, the member 48 has a surface 51, and the member 38 has a surface 52, both of which surfaces 51 and 52 are generated about a center B and of course are on the same radii, so that the surfaces 51 and 52 are portions of spheres and are fully mated together.

It will therefore be seen that the surfaces 32 and 33 are portions on a sphere having its center at A. Also, surfaces 51 and 47 are portions of a sphere having its center at point B. It can therefore be said that the pieces 41 and 48 form a sphere with their surfaces 44 and 49, and these pieces are movable universally around the center A, as the pieces slide along the surfaces 32 and 33 which are fixed but which are also portions of the sphere generated about center A.

Likewise, pieces 38 and 39 form a portion of a sphere generated about the center B and at their surfaces 52 and 46, which surfaces are in sliding contact with the portions of pherical surfaces 51 and 47, respectively. Thus terming these pairs of respective parts 41 and 48 a large sphere, and the parts 38 and 39 a small sphere, it will then be understood that the respective parts are capable of moving in universal directions about their respective centers A and B. FIG. 2 shows the large sphere to be tipped downwardly at the extending end of the drill bit 29, and this would put the extending tip of the drill downwardly in FIGS. 1 and 2, with respect to its inner end 37. Then, upon rotation of the pieces 38 and 39 about their center B the drill 29 can be aligned with the axis of the spindle holder members, which would be the center of the spindle 10, as desired. FIG. 2 is therefore showing that the smaller sphere parts 38 and 39 are rotated to again bring the drill tip 53 upwardly to where it will be co-axial with the spindle 10, if desired.

There is therefore, in effect, two nested spheres, with different centers and different radii with respect to the parts forming the spheres. Thus it will be understood that rotation of the larger sphere will offset the center B of the smaller sphere, such as putting it downwardly as shown in FIG. 2. Subsequent adjustment of the small sphere will therefore align the drill bit 29, but now on the axis extending through the center B, which preferably places the center B and the axis of the drill bit 29 coaxial with the spindle 10.

Of course it will also be understood that if it were desired to have the cutter tip 53 on the axis of the spindle 10, but to have the cutter inner end 37 slightly off the axis, this would then provide for tapered cutting, or like machining or tool work at an angle, then suitable adjustments could be made with the holder described.

With reference to clamping on the collet 34, it will now be understood that axial pressure on the members 38, 39, and 41 will cause the radially inward pressure on the collet 34. Thus the member 38 is annular and extends around the circular portion 54 of the collet 34, and the piece 38 engages the shoulder 56 on the collet 34. Thus pressure on the piece 38, to the right in FIG. 2, will hold the collet from moving to the left in FIG. 2, while the pieces 39 and 41 exert a pressure to the left, in FIG. 2, and thereby cause the collet 34 to clamp radially inwardly, as desired.

Such clamping pressure is obtainable by forcing to the right, in FIGS. 1 and 2, on the tubular piece 18. Such force is created by providing a nut 57 threaded on the tubular piece 14. The nut 57 engages the projections 26 on the piece 18 and thereby draws the entire piece 18 to the right when the nut 57 is threaded along the piece 14.

Different means can be provided for rotating the pieces of the collet clamp and the adjusting member 48 about the center A. One such means is shown in FIG. 2 where the piece 48 is provided with four projections 58 extending through the slots 19 of the piece 18. Thus the four slots 19 provide a means of assembling the holder with the pieces shown. Of course moving the pieces 58 radially of the longitudinal axis of the holder, will cause the collet clamp and the piece 48 to rotate about the center A which is axially offset from the plane of the pieces 58. Such radial movement of the pieces 58 is caused by a cylindrical piece 59 surrounding the piece 18 and presenting an annular cam surface 61. The cam surface 61 is in sliding contact with the arcuate surfaces 62 of the projections 58. Thus rotation of the member 59 will cause the cam 61 to move the pieces 58 radially, as desired. The piece 59 has internal threads which engage the threads 28 on the piece 18, and thus the accurate rotational and longitudinal positioning of the piece 59 can be achieved through the threaded action. A lock or jam nut 63 is also threaded on the threads 28, so the piece 59 can be held in a selected set position which sets the adjustment of the adjusting member 48.

Seals, such as O-rings such as 64 and 66 are provided as shown for keeping dust, chips, and cooling liquids away from the interior of the holder so that the parts will not become contaminated and defective.

It will therefore be seen that the holder includes the collet clamp having two pieces 38 and 39 spaced longitudinally of the collet 34 so that, when these pieces are influenced by their adjacent pieces 48 and 41, respectively, they adjust the position of the collet 34. Further, the pieces 48 and 41 are themselves adjustable, so that complete universal adjustment of the drill 29 is obtainable, for either aligning or offsetting the drill 29 with the axis of the spindle 10 and the spindle holder members, and for disposing the axis of the drill 29 at an angle with respect to the axis of the spindle 10 and the spindle holder members described. This therefore means that both the tip end 53 and the inner end 37 of the drill bit 29 can be independently and separately disposed with respect to the spindle axis 10 and the axis of the holder members described. Also, while the dotted line 33 in FIG. 1 shows a portion of the large sphere, the dotted circle 67 in FIG. 1 shows the location of what is termed the smaller sphere.

FIG. 5 shows another embodiment of the tool and the small sphere, as represented by the circle 67 and center B. The collet 34 is not needed where the tool itself has a taper on its shank. Such tapered tool is a commonly known design. In FIG. 5, a tool 68 has a piece 69 thereon, and the piece 69 replaces the collet 34 and the pieces 38 and 39 in the other embodiment. That is, the piece 69 is affixed with the tool 68, or it can be made to be affixed if it is a separate piece. It is formed of a spherical shape such that it presents spherical shapes or portions 71 and 72, which have the surfaces 52 and 46, respectively, as in the other embodiment.

Also, the surfaces 52 and 46 serve to provide the tapered or oblique surfaces relative to the axis of the tool 68, so they effect radial clamping when the holder is tightened by drawing back on piece 18 to cause surfaces 51 and 47 to force on surfaces 52 and 46 respectively.

With regard to the embodiments, there are two movable members in the spherical pieces 69, and 41 and 48, and the clamp includes the pieces 69, 41, and 48, with the piece 48 being the adjusting member for the holder, by virtue of the ears 58.

I claim:
1. In a radially adjustable tool holder for holding a tool extending axially therefrom, a spindle mountable member having a longitudinal axis co-extensive with the axis of said tool, a clamp operatively interposed between said tool and said spindle mountable member and being displaceable with respect to the latter for clamping said tool, the improvement comprising two movable members included in said clamp and having spherically shaped surfaces in sliding contact with each other and with said members being separately adjustable with respect to said spindle mountable member at locations spaced apart along the axis of said tool for separate and a universal type of adjustment of said tool radially of said spindle mountable member to thereby separately radially adjust both the extending end of said tool and the other end of said tool inside said holder, and means for releasably securing said two movable members in adjusted positions.

2. The subject matter of claim 1, wherein said two movable members both have their spherically shaped surfaces generated about two different centers.

3. The subject matter of claim 2, wherein said spherically shaped surfaces are shaped and disposed as if they were portions of the surfaces of spheres nested together and of different length radii.

4. The subject matter of claim 1, wherein one member of said two movable members is in operative contact with said tool and the other member of said two movable members is in contact with both said one member and said spindle mountable member.

5. The subject matter of claim 1, wherein said holder includes a cam and said clamp includes a cam follower for adjustment of said tools.

6. The subject matter of claim 1, wherein said means includes a threaded clamp lock member operative on said clamp and being movable axially of said tool, and said clamp and said tool having surfaces in sliding contact with each other on a plane oblique to the axis of said tool for urging radially inwardly onto said tool in response to axial movement of said clamp lock member.

7. In a radially adjustable tool holder for holding a tool extending axially therefrom, a spindle mountable member having a longitudinal axis co-extensive with the axis of said tool, a clamp operatively interposed between said tool and said spindle mountable member and being displaceable with respect to the latter for clamping said tool, the improvement comprising two movable members included in said clamp and being separately movable radially of said spindle axis for separate adjustment of each of said two movable members with respect to said spindle mountable member at locations spaced apart along the axis of said tool for separately radially adjusting both the extending end of said tool and the other end of said tool inside said holder, one member of said two movable members being in operative contact with said tool and the other member of said two movable members being in contact with both said one member and said spindle mountable member.

References Cited
UNITED STATES PATENTS 2,427,855   9/1947   Grunlan _____ 279—6XR
2,463,857   3/1949   Dietz _____ 279—6

ANDREW P. JUHASZ, Primary Examiner

D. D. EVENSON, Assistant Examiner